Oct. 22, 1929.  V. K. ZWORYKIN  1,732,874

PHOTOGRAPHIC SOUND RECORDING

Filed May 26, 1927

WITNESSES:
R. S. Williams
W. H. Whitbeck Jr.

INVENTOR
Vladimir K. Zworykin
BY
Wesley G. Carr
ATTORNEY

Patented Oct. 22, 1929

1,732,874

UNITED STATES PATENT OFFICE

VLADIMIR K. ZWORYKIN, OF SWISSVALE, PENNSYLVANIA, ASSIGNOR TO WESTINGHOUSE ELECTRIC & MANUFACTURING COMPANY, A CORPORATION OF PENNSYLVANIA

PHOTOGRAPHIC SOUND RECORDING

Application filed May 26, 1927. Serial No. 194,495.

This invention relates to the photographic recording of sound and more particularly to sound-recording systems in which the quantity of light admitted to a photographic film is varied by electrical means.

It is an object of this invention to produce a device in which distortion will be minimized.

It is a further object of this invention to produce a device for recording sound photographically in which the record of the sound shall be superposed as a modulation upon a photographic record of a steady frequency.

It is a further object of this invention to provide means whereby the light may be admitted to the record film over only a very narrow area extending across the record strip and to correctly proportion the width of said narrow area to the wave length upon the record of the carrier frequency.

It is a further object of this invention to ensure that the relation of said width to the wave-length shall result in maximum amplitude of the carrier-frequency change of density on the film.

It is a further object of my invention to provide a lighted area so narrow that no distortion of the sound will result from its width.

Other objects of this invention will be apparent from the following detailed description which is most readily understood by reference to the accompanying drawings, in which Fig. 1 is a diagram of circuits and apparatus used in recording;

Figure 1:
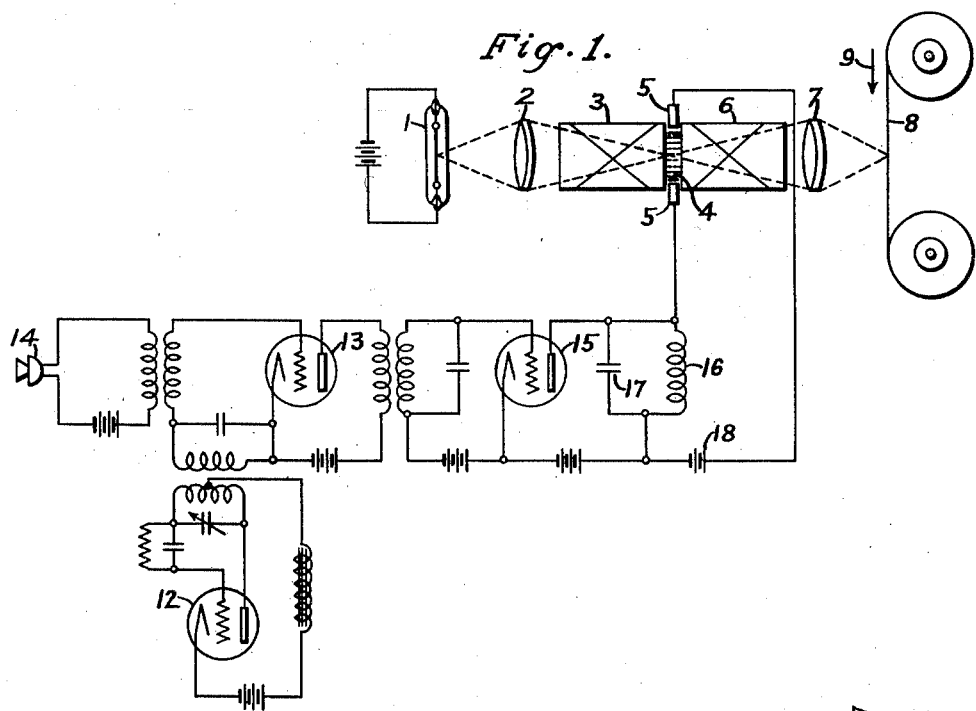

The light source 1 in Fig. 1 is preferably a lamp having a straight filament of small cross section. In the drawings, the filament has been shown in the plane of the paper for convenience. In the actual construction, the filament would have a direction at right angles to said plane. The light from the source 1 passes through a converging lens 2 and then through a Nicol prism 3, by means of which it is polarized. The polarized light passes through a Kerr cell comprising an optically active material 4 and a pair of electrodes 5. The boundary of the light beam is determined by the edges of the opposed surfaces of the electrodes. The Kerr cell is so positioned relative to the lens 2 that the filament of the lamp 1 and the middle of the light-path through the material 4 are at conjugate foci.

Another Nicol prism is placed upon that side of the Kerr cell from which the light emerges and by means of a lens 7 the light is brought to a focus upon a photographic film 8. The film is moved by any of the usual provisions, such as a pair of spools, and the motion is indicated upon the drawing by the arrow 9. The direction of movement of the film 8 is at right angles to the length of the filament of the lamp 1, whereby the image of the filament upon the film is a straight line at right angles to the length of the film.

Figure 3:
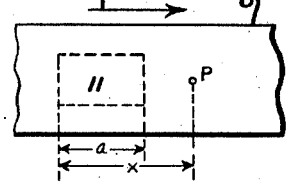
Fig. 3 is a diagram to which reference will be made to explain the mathematical principles involved in this invention.

In Fig. 3, the width of this line is greatly exaggerated for the sake of clearness the line being represented by the dotted rectangle 11. It will be observed that the length of the line, which is the vertical dimension of the rectangle 11 in Fig. 3, is less than the width of the film 8.

Upon the electrodes 5 a varying difference of potential is impressed in order to vary the brightness of the light emerging from the Kerr cell. The difference of potential is provided by vacuum tubes and circuits, including an oscillator tube 12 which delivers a carrier-frequency potential change to the grid of the tube 13. The potential of the grid of the tube 13 is also varied by means of a microphone 14. The output in the plate circuit of the tube 13 is, therefore, a carrier-frequency current modulated by an audio frequency. This current is amplified by the tube 15.

In the plate circuit of the tube 15, a parallel-resonant combination including a coil 16 and a condenser 17 is provided. This combination is of high impedance to the carrier frequency. The difference of potential corresponding to the carrier-frequency in the plate circuit of the tube 15 is therefore composed almost wholly of the drop across this combination. The lead wires from two sides of this combination to the two electrodes 5 therefore deliver to the Kerr cell as great potential changes as can be obtained from the tube 15.

Figure 2:
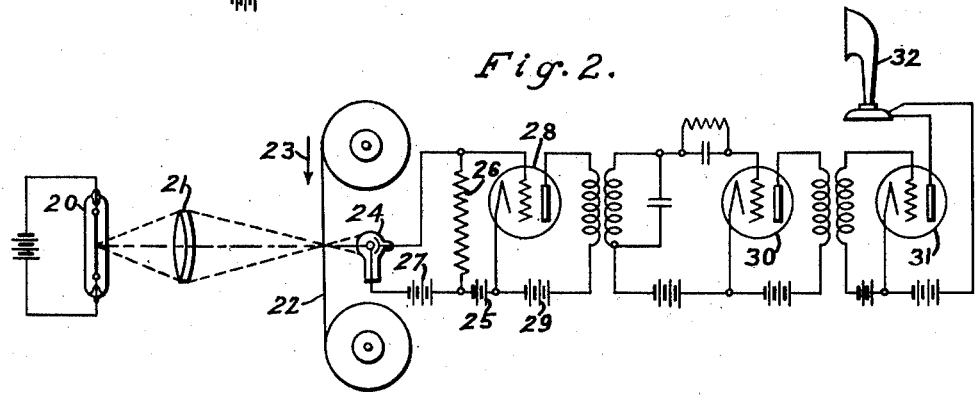
Fig. 2 is a diagram of circuits and apparatus used in reproducing.

In the reproducing device shown in Fig 2, a lamp 20, similar in form to the lamp 1, provides light which is focused by the lens 21 upon a photographic sound record 22, which is moved by suitable mechanism, indicated by spools, in the direction indicated by the arrow 23.

The light from the source 20 is obstructed to a varying degree by the sound record 22. Varying intensity of light, therefore, reaches the photocell 24 and the conductivity of this cell varies in accordance with the density of the photographic record. A battery 25, a resistor 26 and a battery 27 co-operate with the photo-cell 24 to vary the potential of the grid of a vacuum tube 28 in a manner familiar to those skilled in the art. The plate circuit of the tube 28 includes the usual B-battery 29 and delivers energy to the succeeding tubes. As illustrated on the drawing, the next tube 30 is a detector, but one or more stages of carrier-frequency amplification may be included between the tube 28 and the detector 30, if desired.

The tube 31 is shown as an audio-frequency amplifier, but it will be obvious that several stages of audio-frequency amplification may be used, if desired, or that the loud speaker 32 or other translating device may be connected directly to the tube 30 without the intervention of amplifiers in cases where amplifiers are not needed.

In the operation of the device, when recording sound by the means illustrated in Fig. 1, the sound is received in the microphone 14 and produces corresponding modulation of the carrier-frequency oscillations generated by the tube 12. The electrostatic field impressed upon the nitro-benzole or other optically-active material 4 varies, therefore, at the carrier-frequency and the variations are modulated in accordance with the sound.

Light from the source 1 is rendered plane-polarized by the Nicol prism 3. Preferably, this prism is so placed relative to the electrodes 5 that the plane of polarization of the light is approximately at an angle of 45° with the field. Preferably too, the bias impressed upon the Kerr cell by the battery 18 is such that the change in the intensity of the emerging light will be as nearly as possible proportional to the changes in the intensity of the field.

The Nicol prism 6 is placed at such an angle that it cuts off all light for the average or steady value of the field. The carrier-frequency changes in the field will, unless a proper bias has been chosen, produce a double-frequency change in the intensity of the light which emerges from the Nicol prism 6, but the audio frequency changes only the amplitude of the carrier-frequency and is, therefore, represented by a change in the average value of the light, and the change in average value is of the same frequency as the sound.

Because the center of the passage between the electrodes in the Kerr cell is at the focus of the lens 2, the maximum angle which the conical beam of light emerging from the lens 2 may possess is the angle subtended by the edges of the electrodes at the center of the optically-active material. Preferably, the focal length of the lens 2 is so chosen that the converging beam will have this angle. Preferably, also, the aperture of the lens 2 is so chosen that it will deliver all of the light beam included within such an angle.

If, instead of a single pair of electrodes, as illustrated in Fig. 1, a Kerr cell, constructed as described in my copending application, Serial No. 183,226 filed April 12, 1927, be employed, the obstruction to the passage of light caused by the lines of metal will be less if the center of the thickness of the cell is at the focus of the lens 2.

The optical system comprising lenses 2 and 7 is so correlated to the actual diameter of the filament in the lamp 1 that the width of the bright line which constitutes the illuminated area upon the film 8 is of the proper magnitude relative to the distance along the film 8 between the record of one maximum of illumination and that of the next. This distance along the film will be called herein the wave length upon the film. It is dependent upon the frequency of the variations in the potential difference between the electrodes 5 and upon the speed of the film. In order to clearly state this relation, it will be necessary to give the results of a mathematical analysis of the quantities involved.

Let the point P (Fig. 3) be fixed relative to the film so that as the film moves the distance from a chosen reference line to this point varies with the time. Let the chosen reference line be the left-hand edge of the illuminated area and $x$ be the distance of the point P from it at the time $t=0$. Then the value of $t$ when P coincided with the reference line is $-\frac{x}{v}$ and the time when P coincided with the right hand edge of the image of the filament is $-\frac{x}{v}+\frac{a}{v}$, where $a$ is the width of the light and $v$ is the velocity.

If the intensity of the illumination varies periodically, it may be represented by $A(1-\sin \nu t)$. Where $A$ is a proportionality factor, $t$ is the time and $\nu$ is $2\pi$ times the carrier frequency. The total light energy delivered to the film at the point P is $$\int_{-\frac{x}{v}}^{\frac{a}{v}-\frac{x}{v}} A(1-\sin \nu t)\,dt$$

Performing the indicated integration gives,—

$$\frac{Aa}{v}+\frac{2A}{\nu}\sin\frac{\nu A}{2v}\cos\left(\frac{\nu x}{v}+\frac{\nu a}{2v}-\frac{\pi}{2}\right)$$

The quantity just computed is a measure of the extent to which the developed film will be blackened. The computation shows that the blackening will have a uniform component extending over the whole film and, in addition thereto, a component which varies from point to point along the film.

This varying component of the blackening is the product of two factors, one of which is independent of the distance along the film. This factor is a measure of the amplitude of the periodic change.

If we apply this formula to the changes which correspond to the modulation, the frequency $\nu$ is the audio frequency. It is, therefore, not a constant but will be different for different sounds, that is, the amplitude of the blackening in the photographic record will not correspond to the amplitude of the sound except at certain frequencies. This variation from true representation of the sound would be recognized as a distortion in the reproduced speech or music.

If, however, the width $a$ of the bright line is small, the expression $\frac{2A}{\nu}\sin\frac{\nu a}{2v}$ is substantially equal to $\frac{Aa}{v}$. This approximation is independent of the frequency $\nu$. This demonstrates that if the width of the filament image be sufficiently small as compared with the wave length upon the film of an audio-frequency change, the distortion will be avoided.

For the carrier-frequency it is not feasible to make the width of the filament image a small fraction of the wave length upon the film. Mechanical difficulties prevent making the filament small enough and defraction effects prevent reducing the image of the filament to so small a size. Moreover, the same difficulties arise if it is attempted to obtain a narrow path of light on the film by means of an excessively narrow slot.

The reasons why the width of the illuminated area must be small compared to the wave length upon the film are not the same for the carrier-frequency as for audio frequency because the carrier-frequency is not a variable frequency.

The amplitude of the variable part of the blackening upon the film is, therefore, a constant. It is, however, possible to so choose the width of the light image that this constant has its most advantageous value. This may be done by making the width of the illumination half of the carrier-frequency wave length upon the film. When this is done, the expression for the blackening becomes $$\frac{\pi A}{\nu}+\frac{2A}{\nu}\cos\frac{\nu x}{v}$$

and it will be noticed that the coefficient of the cosine term has become, a maximum.

The width of the image of the filament upon the film should, therefore, be such that it is half of the wave length upon the film of the carrier-frequency. When, in addition to this, the carrier-frequency is high compared with the highest audio frequency which it is expected to record, the distortion will have become imperceptible.

A suitable carrier-frequency for the usual case, in which 5,000 cycles is the highest audio frequency to be recorded, is a carrier-frequency of 20,000 cycles. Half of the wave length of the carrier-frequency is then one-eighth of the wave length of the highest audio frequency to be recorded. I have found by computation that the distortion which can result under these circumstances is only slightly greater than 2%. Moreover, this distortion is present only at the very highest audio frequencies. For all except these special audio frequencies, the distortion is imperceptible.

In ordinary moving-picture machines, the film moves 85 feet per minute. The wave length upon the film moving at this speed for a frequency of 20,000 cycles is .00085 inches. The best results will, therefore, be obtained by making the width of the image of the filament upon the film .000425 inches. Lamps may be obtained in the market with a filament having a diameter of .002 inches. If, therefore, the optical system be designed so that the image is reduced 4.7 times, the proper width of the image upon the film will be obtained.

The lamps just mentioned, which can be obtained in the open market, have filaments five-eighths of an inch long. Upon the film with the reduction just mentioned, the image will be .133 inches long. This is narrower than the standard moving picture film and for this reason in Fig. 3 the rectangle 11 is shown as occupying less than the whole width of the film 8. The part of the film which is not occupied by the sound record may be used for an ordinary moving picture record, for the sprocket holes, for synchronizing devices, or for any other purposes which are deemed desirable.

A sound record, made by exposing a film in the way explained in connection with Fig. 1 and developing it as any photograph is developed, may be used for the reproduction of sound by means of apparatus similar to that illustrated in Fig. 2. Light from the lamp 20 is brought to a focus upon the record 22, the lamp 20 being of the same character as the lamp 1 and the lens 21 having the same reducing power as the optical system comprising lens 2 and 7, the image of the filament from the lamp 20 upon the film 22 will be of the same width as the image upon the film 8. The freedom from distortion and the maximum amplitude for the carrier-frequency which were noted in connection with the discussion of Fig. 1, will be obtained for similar reasons when reproducing the sound.

The illumination of the photo-cell 24 varies at the carrier frequency as the film 22 moves at the same speed as the film 8. These variations will be modulated by the change in average blackening of the film which was produced by the modulation of the carrier frequency. As a consequence, the photo-cell 24 combined with the resistor 26 and batteries 25 and 27 will cause a carrier-frequency current in the output of the tube 28 which will be modulated at the audio frequency. This carrier current, either at once or after amplification, is impressed upon the detector 30 with the result that the carrier-frequency is rectified and only the modulation frequency is delivered to the amplifier 31 and thus to the translating device 32.

It is a consequence of using modulated carrier frequency that the double-frequency effect in the Kerr cell is without result in the reproduced sound. The carrier-frequency has the further advantage that, if desired, the battery 18 for biasing the Kerr cell may be avoided and the amplitude of the carrier-frequency itself may serve instead as the bias.

Another advantage of the system herein presented is that the image of the filament and not merely light admitted through a slot is used to illuminate the film. The difficulties incident to forming a slot of the small width required and the defraction effects which result from the narrowness of such a slot are thereby avoided.

Many other advantages will be apparent to those skilled in the art. It will also be apparent to them that many modifications of the apparatus specifically illustrated and described can be made within the spirit of this invention. I therefore do not wish to be limited except as indicated by the accompanying claims or required by the prior art.

I claim as my invention:

1. In combination, an electrically-controlled light valve, means including a source of electrical oscillations of super-audio frequency for impressing a carrier-frequency on said valve, means for modulating said oscillations, means for moving a light-sensitive surface, and means for illuminating a portion of said surface through said valve, the speed of said motion being twice the width of said portion in a period of said carrier-frequency.

2. In a photographic recording device, means for moving a light-sensitive ribbon lengthwise, means for illuminating a stationary narrow area extending across said ribbon, and means for periodically varying the intensity of said illumination, whereby the resulting record will vary in density therealong, the width of said area being such that maximum periodic variation of density occurs, and means for modulating the periodic variation of the intensity of illumination.

In testimony whereof, I have hereunto subscribed my name this 24th day of May, 1927.

VLADIMIR K. ZWORYKIN.